United States Patent [19]

Wilson et al.

[11] Patent Number: 4,533,746

[45] Date of Patent: Aug. 6, 1985

[54] 2-METHOXY-4-(2-METHYLPROPENYL) PHENYL ESTER OF ISOBUTYRIC ACID, FLAVOR USE THEREOF AND PROCESS FOR PREPARING SAME

[75] Inventors: Richard A. Wilson, Westfield; Michael J. Zampino, North Bergen; David R. Bowen, Red Bank; Domenick Luccarelli, Jr., Neptune, all of N.J.

[73] Assignee: International Flavors & Fragrances Inc., New York, N.Y.

[21] Appl. No.: 623,460

[22] Filed: Jun. 22, 1984

Related U.S. Application Data

[62] Division of Ser. No. 505,411, May 16, 1983, Pat. No. 4,473,588.

[51] Int. Cl.$^3$ ................ C07C 67/08; C07C 69/035
[52] U.S. Cl. .................................... 560/144
[58] Field of Search ............................ 560/144, 130

[56] References Cited

U.S. PATENT DOCUMENTS 2,916,499 12/1959 Blair ........................... 560/144 X
4,347,256 8/1982 Bowers ....................... 560/144 X

FOREIGN PATENT DOCUMENTS 2719623 12/1977 Fed. Rep. of Germany.

OTHER PUBLICATIONS

Arctander, S.; *Perfume and Flavor Chemicals*, vol. 1, 1969, Monograph No. 15.
*Chemical Abstracts*, vol. 87, 1977, Abstract No. 19035h, Carter et al.

*Primary Examiner*—Natalie Trousof
*Assistant Examiner*—Patricia M. Scott
*Attorney, Agent, or Firm*—Arthur L. Liberman

[57] ABSTRACT

Described is 2-methoxy-4-(2-methylpropenyl) phenyl ester of isobutyric acid of our invention having the structure:

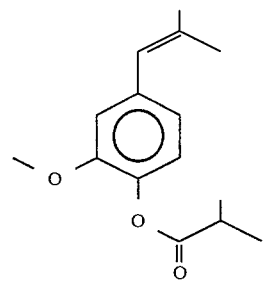

and uses thereof in augmenting or enhancing the aroma or taste of consumable materials including foodstuffs, chewing gums, toothpastes, medicinal products and chewing tobaccos and the process for preparing said 2-methoxy-4-(2-methylpropenyl) phenyl ester of isobutyric acid by reacting isobutyric anhydride with vanillin according to the reaction sequence:

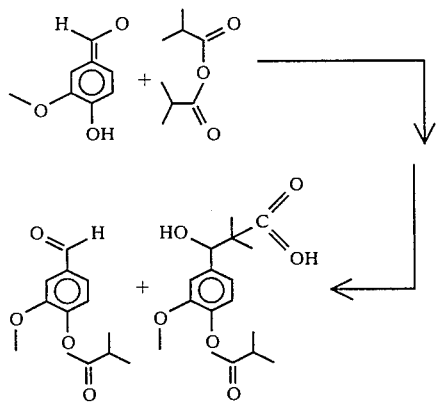

and

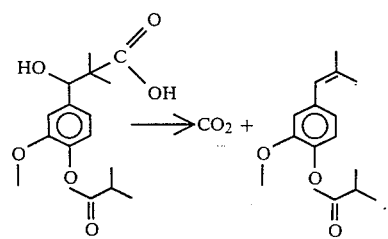

2 Claims, 5 Drawing Figures

GLC PROFILE FOR EXAMPLE I, BULKED FRACTIONS (3-8)

GLC PROFILE FOR EXAMPLE I, MAGNIFICATION BULKED FRACTIONS 3-8.

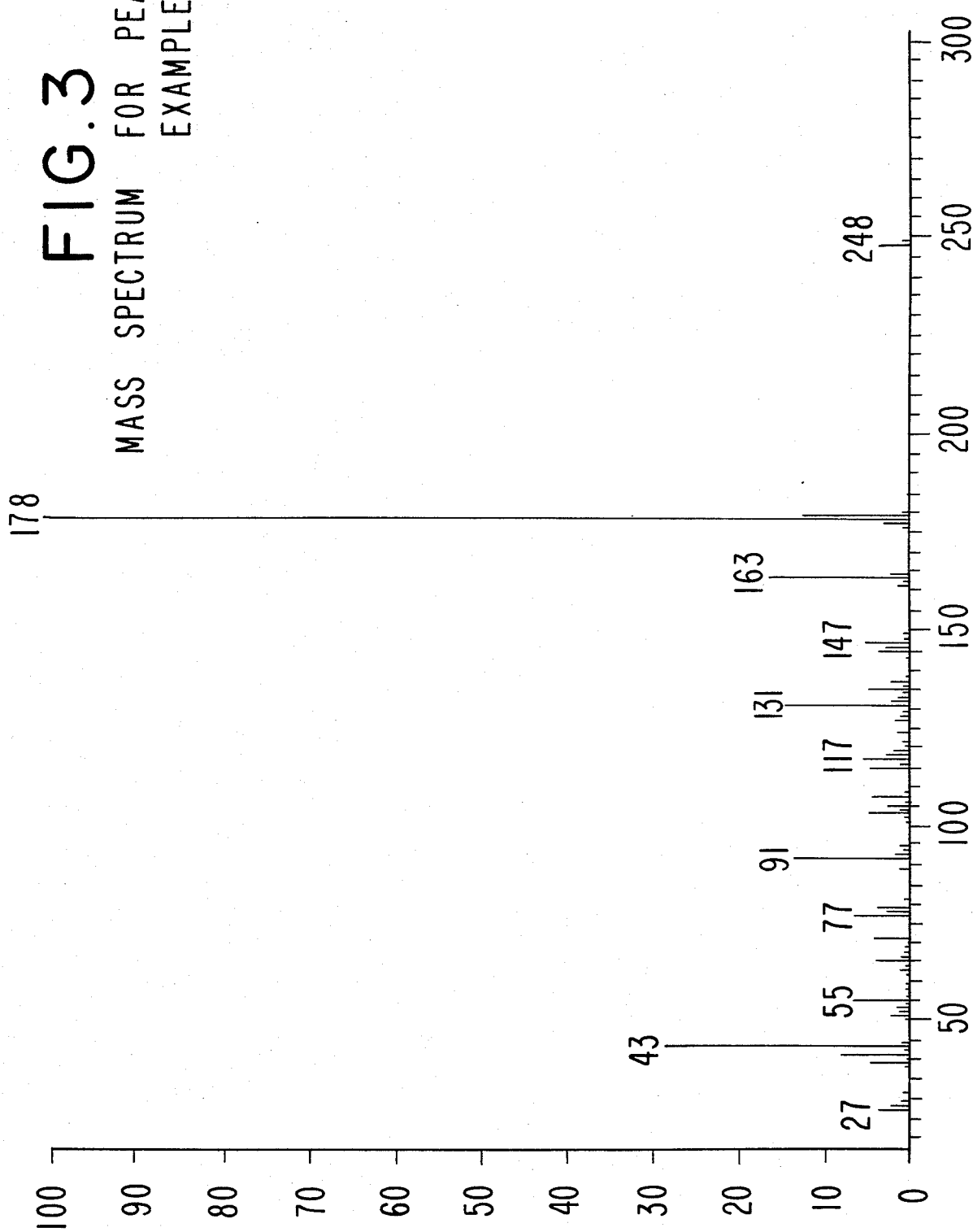
FIG. 3 MASS SPECTRUM FOR PEAK 21, EXAMPLE I.

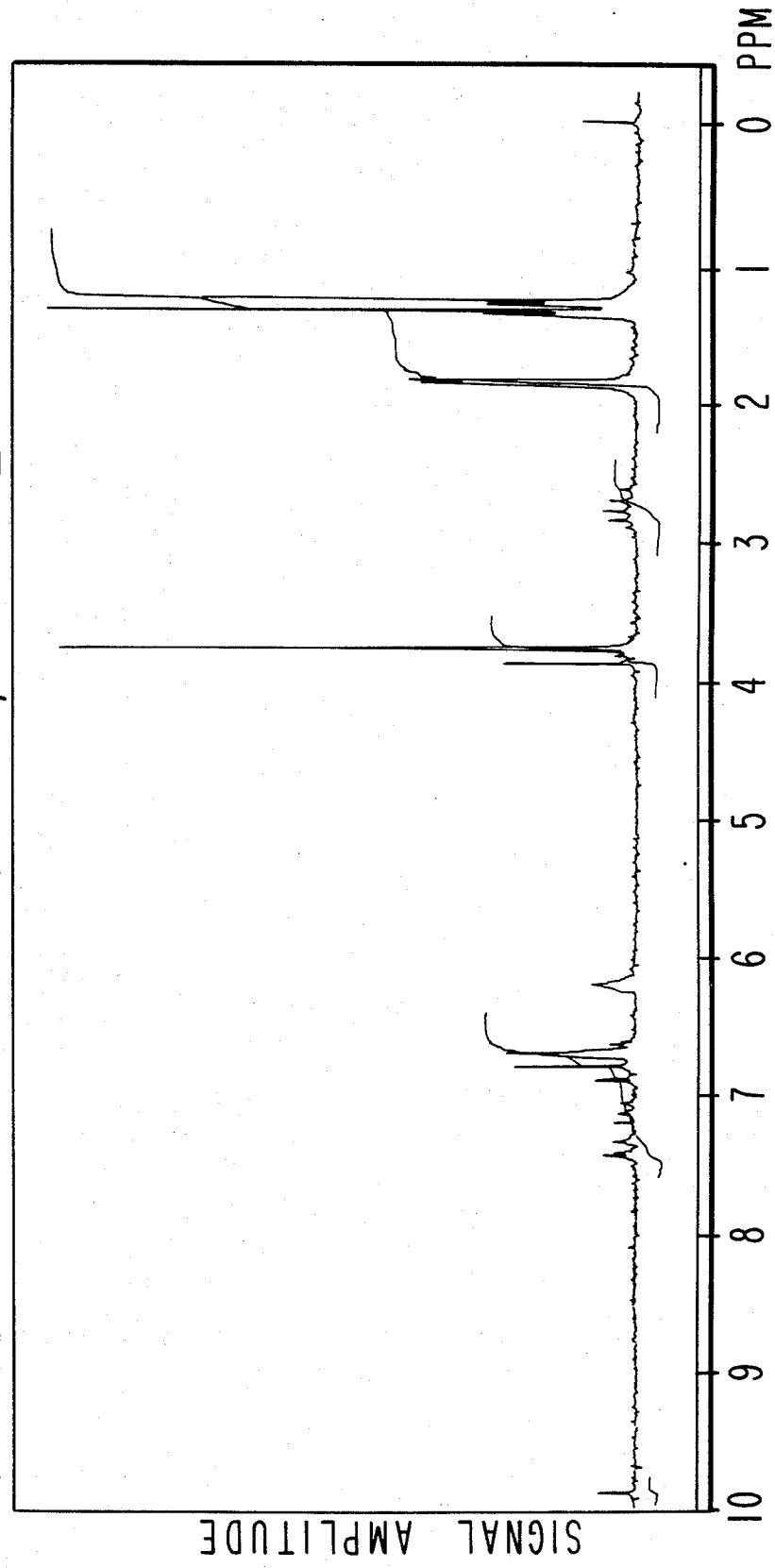

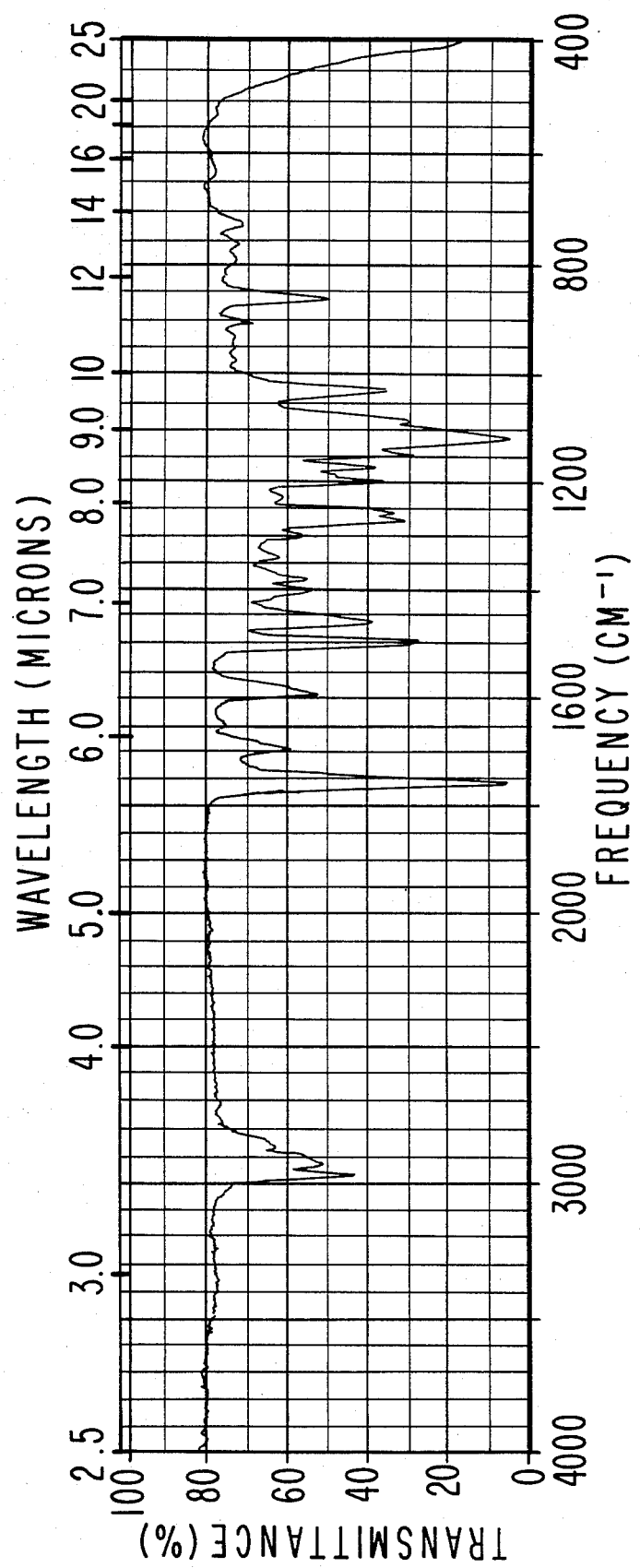

2-METHOXY-4-(2-METHYLPROPENYL) PHENYL ESTER OF ISOBUTYRIC ACID, FLAVOR USE THEREOF AND PROCESS FOR PREPARING SAME

This is a divisional of application Ser. No. 505,411, filed 5-16-83 now U.S. Letters Pat. No. 4,473,588 issued on Sept. 25, 1984.

BACKGROUND OF THE INVENTION

The present invention relates to 2-methoxy-4-(2-methylpropenyl)phenyl ester of isobutyric acid having the structure:

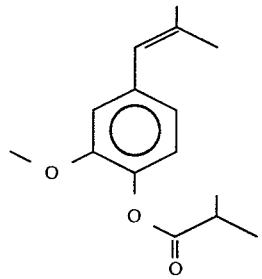

and organoleptic uses thereof in augmenting or enhancing the aroma or taste of consumable materials such as foodstuffs, chewing gums, toothpastes, medicinal products and chewing tobaccos and processes for preparing 2-methoxy-4-(2-methylpropenyl)phenyl ester of isobutyric acid by reacting isobutyric anhydride with vanillin and then heating the resulting product according to the reaction sequence:

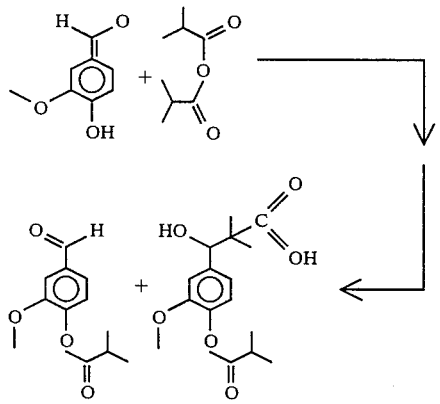

and

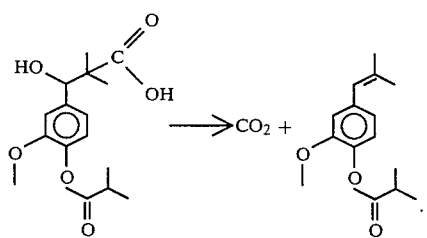

There has been considerable work performed relating to substances which can be used to impart (augment or enhance) fragrances to (or in) various consumable materials. These substances are used to diminish the use of natural materials some of which may be in short supply and to provide more uniform properties in the finished product.

Eggnog-like, nutmeg-like, carnation, chocolate-sweet, and vanilla bean aroma characteristics and eggnog-like, nutmeg-like, carnation, vanilla bean-like, gooseberry, and fruit seed-like flavor characteristics are highly desirable for many uses in foodstuffs, chewing gums, toothpastes, medicinal products and chewing tobacco flavors.

Acet-iso-eugenol having the structure:

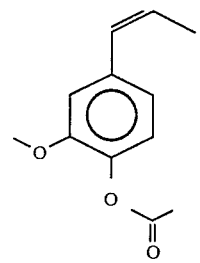

is described in "Perfume and Flavor Chemicals (Aroma Chemicals)" by Steffen Arctander, 1969, (Monograph 15) as having a fruity-balsamic, warm and faintly spicy odor, somewhat clove-like, but with rosy floral notes and vanilla-like sweetness. In flavors Arctander indicates that this material is for berry, fruit and spice compositions and useful in concentrations of from 0.4 up to 17 ppm. Acet-iso-eugenol is G.R.A.S. on the F.E.M.A. list as No. 2470. Vanillin acetate having the structure:

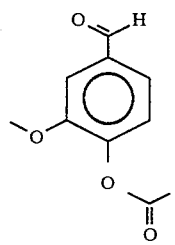

is described by Nunomura, et al in Agric.Biol.Chem. 44 (2), 339,351 (at page 345) to be a flavor component in the acetic fraction of Shoyu (soy sauce).

Nothing in the prior art discloses or infers the compound having the structure:

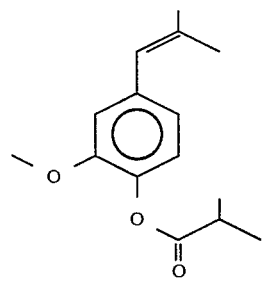

or its use in augmenting or enhancing the aroma or taste of foodstuffs, chewing gums, toothpastes, medicinal products or chewing tobaccos. Furthermore, nothing in the prior art infers the production of the compound having the structure:

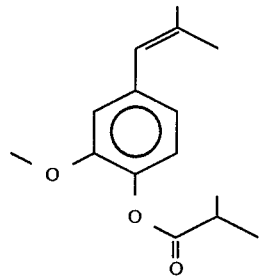

by starting with reacting vanillin having the structure:

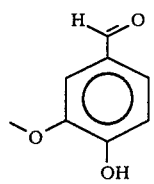

with isobutyric anhydride having the structure:

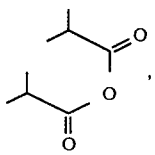

going through the novel intermediate having the structure:

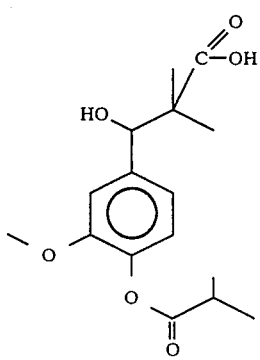

and then decarboxylating the intermediate having the structure:

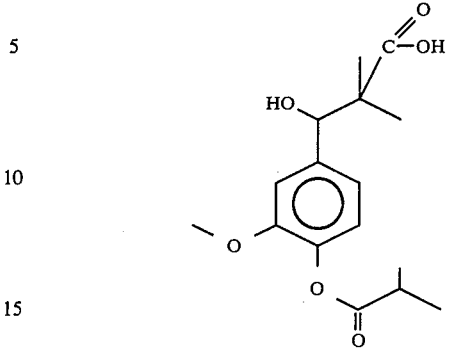

to yield the 2-methoxy-4-(2-methylpropenyl)phenyl ester of isobutyric acid of our invention having the structure:

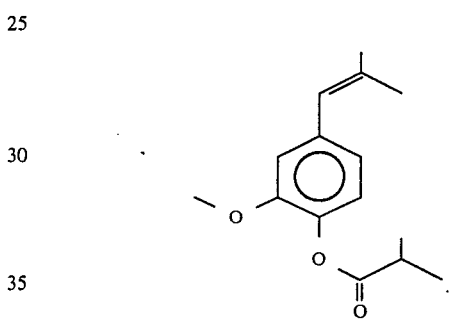

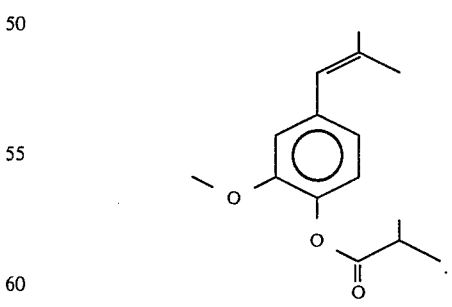

Figure 1:
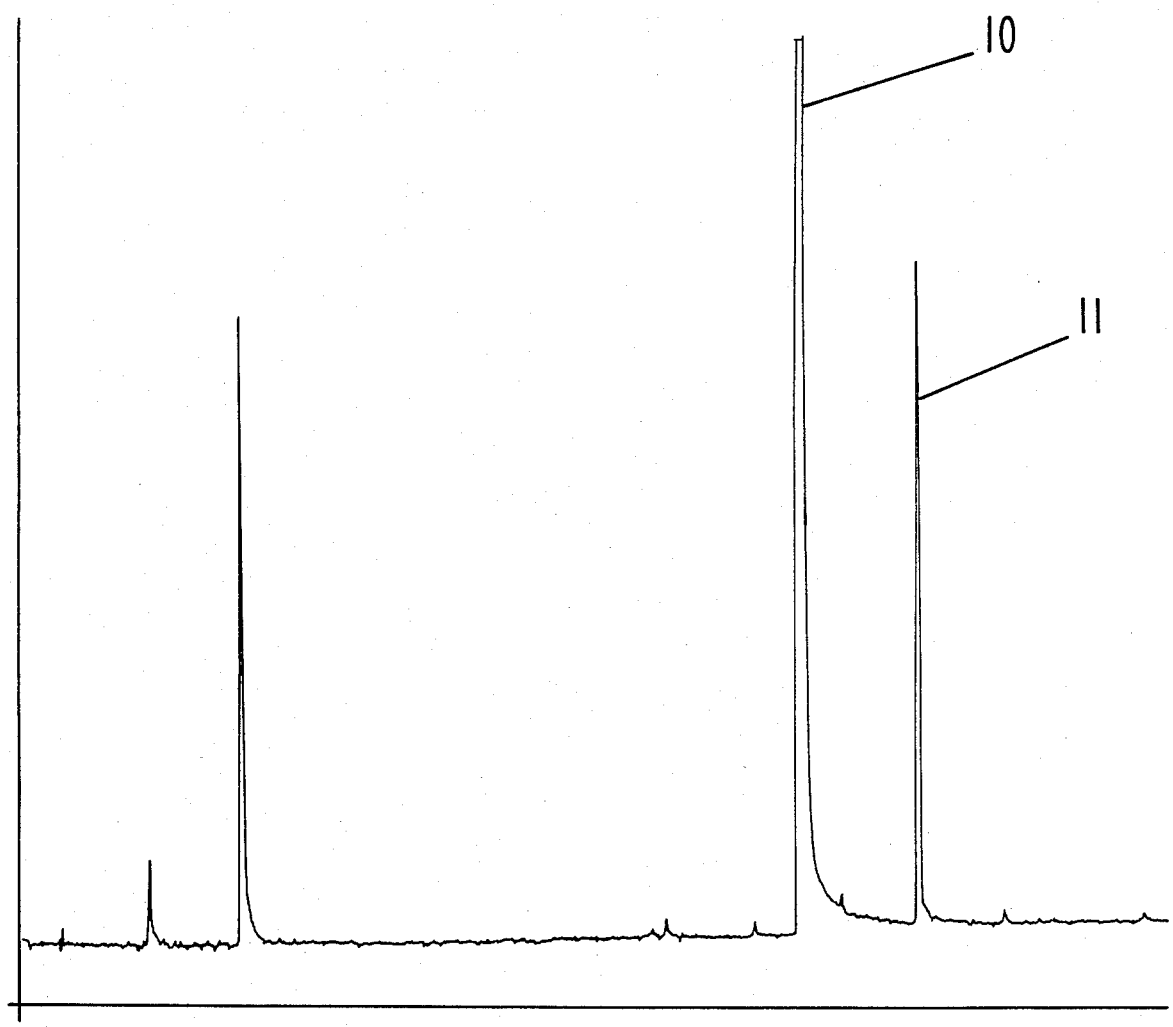
FIG. 1 is the GLC profile for bulked fractions 3-8 of the distillation product of the reaction product of Example I containing the compound having the structure.
Figure 2:
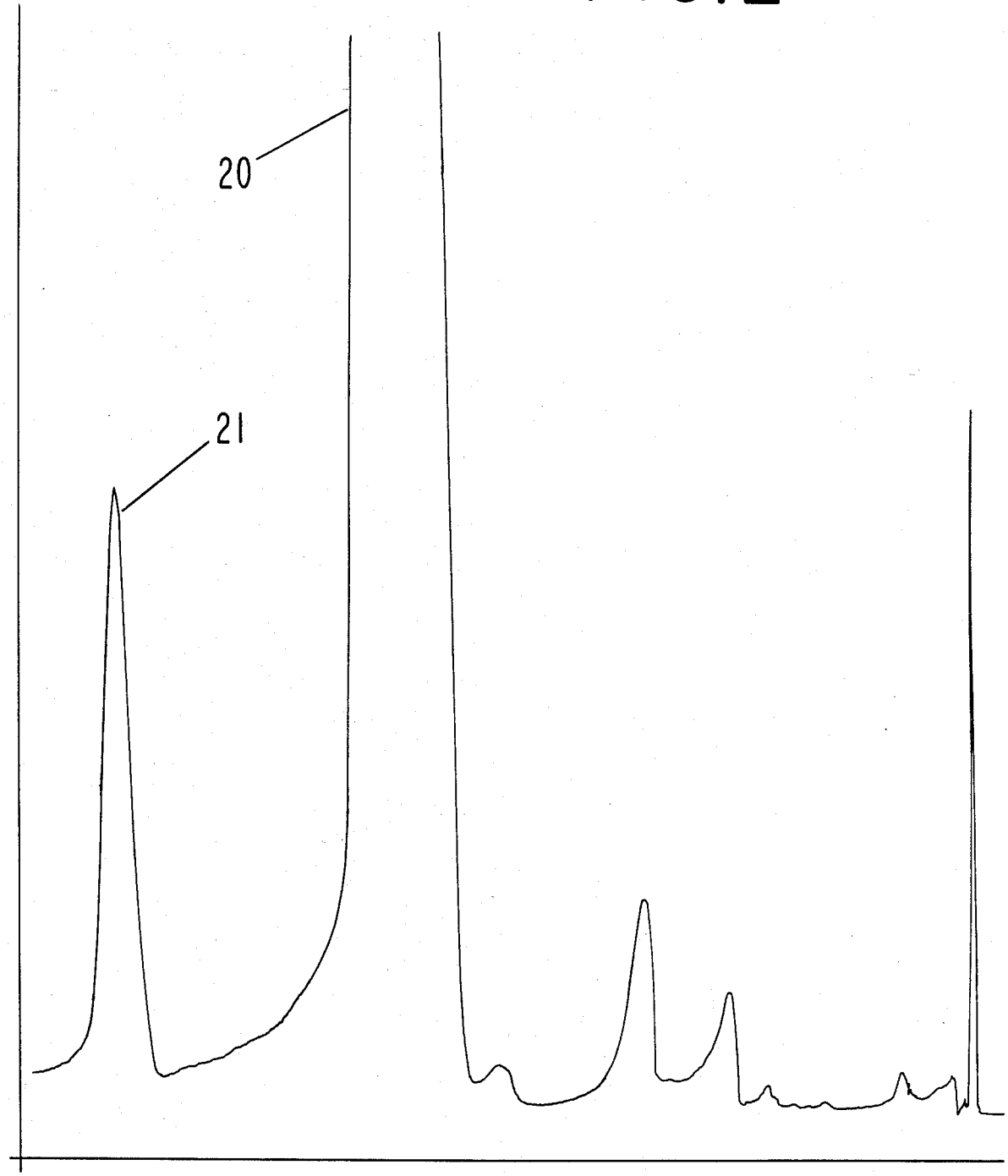

FIG. 2 is a magnification of the GLC profile of FIG. 1, for bulked fractions 3-8 of the distillation product of the reaction product of Example I containing the compound having the structure:

as well as the compound having the structure:

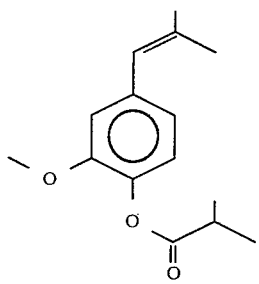

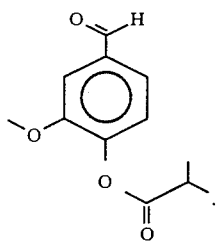

FIG. 3 is the mass spectrum for the peak indicated by reference numeral "21" of FIG. 2 (the GLC profile for bulked fractions 3-8 of the distillation product of the reaction product of Example I). Peak "21" consists of the compound having the structure:

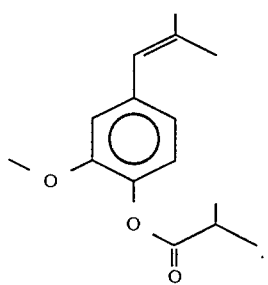

FIG. 4 is the NMR spectrum for peak "21" of FIG. 2, for the compound having the structure:

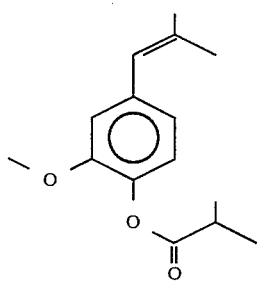

(conditions: Field strength: 100 MHz, solvent: CFCl₃).

FIG. 5 is the infra-red spectrum for the peak indicated by reference numeral "21" on the GLC profile of FIG. 2 for the compound having the structure:

DETAILED DESCRIPTION OF THE DRAWINGS

FIG. 1 is the GLC profile for bulked fractions 3-8 of the distillation product of the reaction product of Example I containing the compounds having the structures:

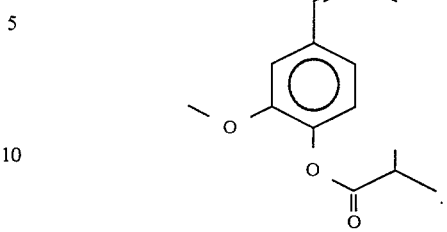

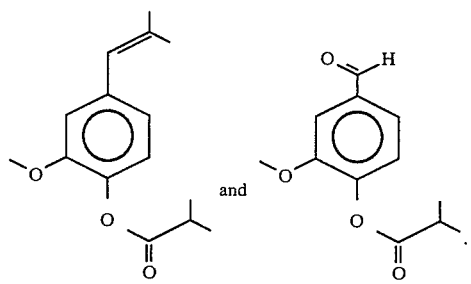

The GLC conditions are: SE-30, column programmed at 100°-225° C. at 4° C. per minute. The peak indicated by reference numeral "10" is the peak for the compound having the structure:

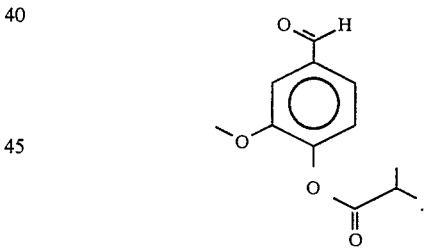

The peak indicated by reference numeral "11" is the peak for the compound having the structure:

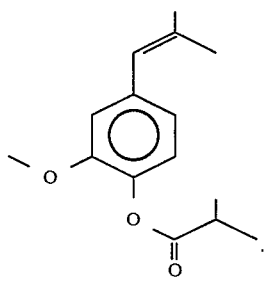

FIG. 2 is a magnification of the GLC profile of FIG. 1 (conditions: 10'×¼", SE 30, column programmed at 100°-220° C. at 4° C. per minute). The peak indicated by reference numeral "21" is the peak for the compound having the structure:

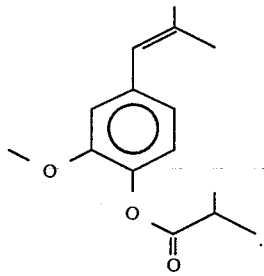

The peak indicated by reference numeral "20" is the peak for the compound having the structure:

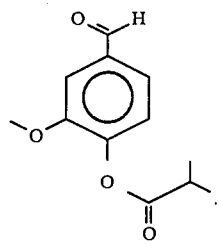

THE INVENTION

It has now been discovered that novel solid and liquid foodstuff, chewing gum, toothpaste, medicinal product and chewing tobacco compositions and flavoring compositions therefor having an eggnog-like, nutmeg-like, carnation, chocolate-sweet, and vanilla bean aroma profile with an eggnog-like, nutmeg-like, carnation, vanilla-bean-like, goose-berry and fruit-seed-like flavor profile may be provided by the utilization of 2-methoxy-4-(2-methylpropenyl)phenyl ester of isobutyric acid of our invention having the structure:

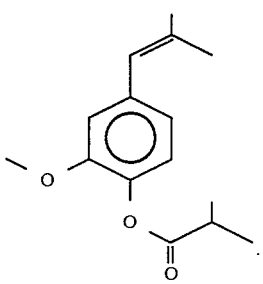

The 2-methoxy-4-(2-methylpropenyl)phenyl ester of isobutyric acid having the structure:

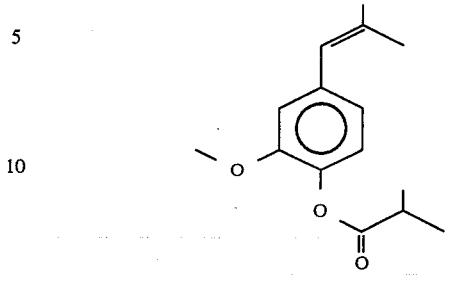

may be produced by first reacting vanillin having the structure:

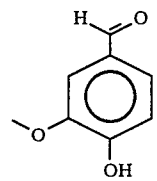

with isobutyric anhydride according to the reaction:

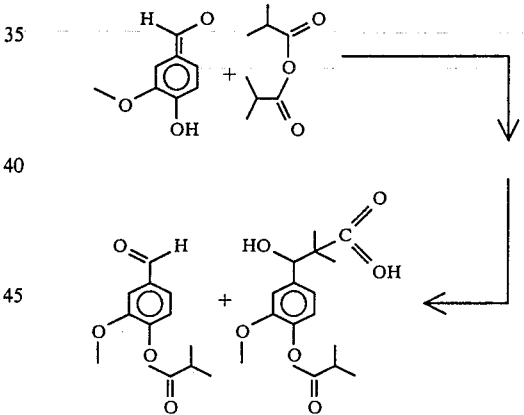

thereby producing vanillin isobutyrate having the structure:

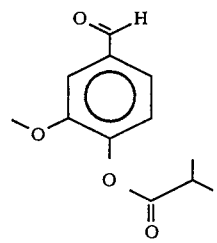

and the intermediate having the structure:

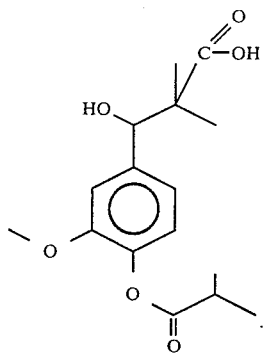

This intermediate on distillation then liberates carbon dioxide according to the reaction:

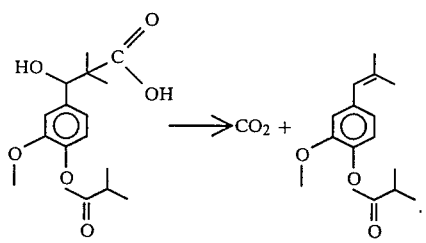

The overall reaction sequence may thus be shown as follows:

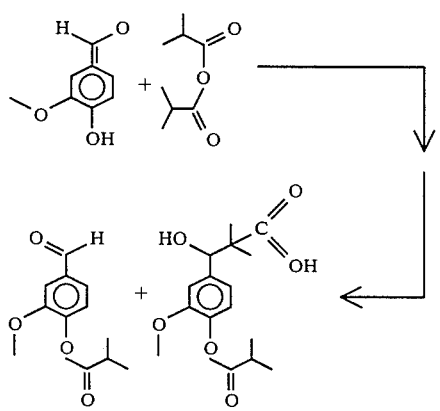

and

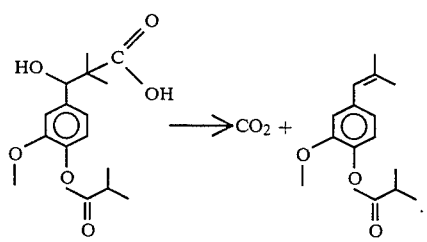

The mole ratio of isobutyric anhydride:vanillin may vary from about 2.5:2 up to about 5:2 with a preferred mole ratio of isobutyric anhydride:vanillin of about 3.5:2.

The reaction temperature is preferably at reflux conditions (e.g., 175° C. at atmospheric pressure). Preferably the reaction is carried out at super atmospheric pressures, (e.g., greater than one atmosphere, that is, from about 1 up to about 10 atmospheres) and temperatures greater than 175° C. (e.g., 175°–250° C.). Higher temperatures give rise to pyrolysis of the reaction product and are thus undesirable. The reaction time may vary from about six hours up to about thirty hours depending upon the reaction temperature and pressure utilized. Lower reaction temperatures and pressures require higher periods of reaction upwards of 24–30 hours, and higher reaction temperatures and pressures give rise to lower reaction time (e.g., 6–10 hours). At the end of the reaction, the reaction mass is neutralized with such materials as saturated aqueous sodium bicarbonate and dried. The reaction mass is then distilled on a fractionation column yielding fractions which are rich in the compound having the structure:

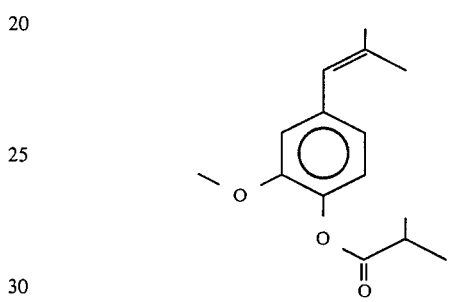

and weak in the compound having the structure:

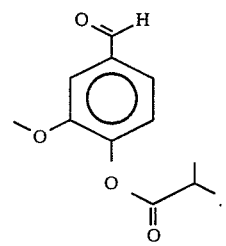

After the final fractionation, the fractions rich in the compound having the structure:

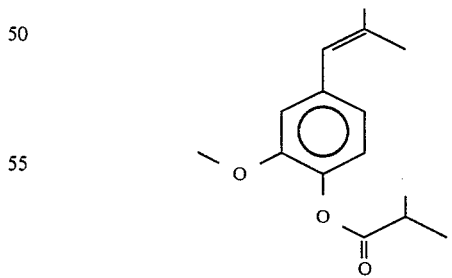

may be finally purified to yield 100 percent of 2-methoxy-4-(2-methylpropenyl)phenyl ester of isobutyric acid of our invention by means of preparative column chromatography techniques which are well known in the art.

The 2-methoxy-4-(2-methylpropenyl)phenyl ester of isobutyric acid of our invention having the structure:

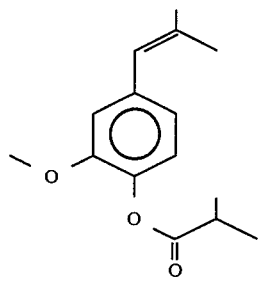

is capable of supplying and/or potentiating certain flavor and aroma notes usually lacking in many diary flavors and fruit flavors.

As used herein, the term "foodstuff" includes both solid and liquid ingestible materials which usually do, but need not, have nutritional value. Thus, foodstuffs includes soups, convenience foods, beverages, dairy products, candies, vegetable cereals, soft drinks, snacks and the like.

As used herein, the term "medicinal products" includes both solids and liquids which are ingestible non-toxic materials which have medicinal value such as cough syrups, cough drops and chewable medicinal tablets.

The term "chewing gum" is intended herein to be a foodstuff composition comprising a substantially water-insoluble, chewable plastic gum base such as chicle, or substitutes therefor, including jelutong, guttakay, rubber or certain comestible natural or synthetic resins or waxes. Incorporated with the gum base in admixture therewith may be plasticizers or softening agents, e.g. glycerine and a flavoring composition which incorporates one or more of the 2-methoxy-4-(2-methylpropenyl)phenyl ester of isobutyric acid of our invention and, in addition, sweetening agents which may be sugars, including sucrose or dextrose and/or artificial sweeteners such as cyclamates or saccharin. Other optional ingredients may be present.

The term "augment" in its various forms is used herein to mean the supplying, modifying or imparting of a flavor or aroma characteristic note or nuance to an otherwise bland, relatively tasteless or non-odorous substance or modifying an existing flavor or aroma characteristic where the natural flavor is deficient in some regard, or supplementing the existing flavor or aroma impression to modify its quality, character, taste or aroma.

The term "enhance" is used herein to mean the intensification of a flavor or aroma characteristic or note without the modification of the quality thereof. Thus, "enhancement" of a flavor or aroma means that the enhancement agent does not add any additional flavor note or nuance.

Substances suitable for use herein as co-ingredients or flavoring adjuvants are well known in the art for such use, being extensively described in the relevant literature. It is required that any such material be "ingestibly acceptable" and thus non-toxic or otherwise non-deleterious, particularly from an organoleptic standpoint whereby the ultimate flavor and/or aroma of the consumable material used does not cause the consumable material to have unacceptable aroma and taste nuances.

It is a further requirement that such material be organoleptically compatible with the foodstuff with which it is used so that the flavor and aroma nuances of such material, taken together with the flavor and aroma nuances of the foodstuff (as a whole) give rise to a harmoniously aesthetically pleasing aroma and taste profile. Such material, in general, may be characterized as flavoring adjuvants or vehicles comprising broadly, stabilizers, thickeners, surface active agents, conditioners, other flavorants and flavor intensifiers.

Stabilizer compounds include preservatives, e.g. sodium chloride; antioxidants, e.g. calcium and sodium ascorbate, ascorbic acid, butylated hydroxyanisole (mixture of 2- and 3-tertiary-butyl-4-hydroxyanisole), butylated hydroxy toluene (2,6-di-tertiary-butyl-4-methyl phenol), propyl gallate and the like and sequestrants, e.g. citric acid.

Thickener compounds include carriers, binders, protective colloids, suspending agents, emulsifiers and the like, e.g. agar agar, carrageenan, cellulose and cellulose derivatives such as carboxymethyl cellulose and methyl cellulose; natural and synthetic gums such as gum arabic, gum tragacanth, gelatin, proteinaceous materials; lipids; carbohydrates; starches, pectins and emulsifiers, e.g. mono- and diglycerides of fatty acids, skim milk powder, hexoses, pentoses, disaccharides, e.g. sucrose, corn syrup and the like.

Surface active agents include emulsifying agents, e.g. fatty acids such as capric acid, caprylic acid, palmitic acid, myristic acid and the like, mono- and diglycerides of fatty acids, lecithin, defoaming and flavor dispersing agents such as sorbitan monostearate, potassium stearate, hydrogenated tallow alcohol and the like.

Conditioners include compounds such as bleaching and maturing agents, e.g. benzoyl peroxide, calcium peroxide, hydrogen peroxide and the like, starch modifiers such as peracetic acid, sodium chlorite, sodium hypochlorite, propylene oxide, succinic anhydride and the like, buffers and neutralizing agents, e.g. sodium acetate, ammonium bicarbonate, ammonium phosphate, citric acid, lactic acid, vinegar and the like, colorants, e.g. carminic acid, cochineal, tumeric and curcumin and the like, firming agents such as aluminum sodium sulfate, calcium chloride and calcium glyconate, texturizers, anti-caking agents, e.g. aluminum calcium sulfate and tribasic calcium phosphate, enzymes, yeast foods, e.g. calcium lactate and calcium sulfate, nutrient supplements, e.g. iron salts such as ferric phosphate, ferrous gluconate and the like, riboflavin, vitamins, zinc sources such as zinc chloride, zinc sulfate and the like.

Other flavorants and flavor intensifiers include organic acids, e.g. acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid, and 2-methyl-cis-3-pentenoic acid; ketones and aldehydes, e.g. acetaldehyde, acetophenone, acetone, acetyl methyl carbinol, acrolein, n-butanal, crotonal, diacetyl, beta,beta-dimethyl-acrolein, n-hexanal, 2-hexanal, cis-3-hexenal, 2-heptenal, 4-(p-hydroxyphenyl)-2-butanone, alpha-ionone, beta-ionone, 2-methyl-3-butanone, 2-pentanone, 2-pentenal and propanal; alcohols such as 1-butanol, benzyl alcohol, 1-borneol, trans-2-buten-1-ol, ethanol, geraniol, 1-hexanol, 2-heptanol, trans-2-hexenol-1,cis-3-hexen-1-ol, 3-methyl-3-buten-1-ol, 1-pentenol, 1-penten-3-ol, p-hydroxyphenyl-2-ethanol, isoamyl alcohol, isofenchyl alcohol, phenyl-2-ethanol, alpha-terpineol, cis-terpineol hydrate, esters, such as butyl acetate, ethyl acetate, ethyl acetoacetate; ethyl benzoate, ethyl butyrate, ethyl caproate, ethyl cinnamate, ethyl crotonate, ethyl formate, ethyl isobutyrate, ethyl isovalerate, ethyl alpha-methyl-butyrate, ethyl propionate, ethyl salicylate, trans-2-hexenyl acetate, hexyl acetate, 2-hexenyl butyrate, hexyl butyrate, isoamyl acetate, isopropyl butyrate, methyl acetate, methyl butyrate, methyl caproate, methyl isobutyrate, methyl-2-methyl-butyrate, propyl acetate, amyl acetate, amyl butyrate, benzyl salicylate, dimethyl anthranilate, ethyl methylphenyl-glycidate ethyl succinate isobutyl cinnamate and terpenyl acetate; essential oils such as jasmin absolute, rose absolute, orris absolute, lemon essential oil, Bulgarian rose, yara yara, natural raspberry oil and vanilla; lactones, sulfides, e.g. methyl sulfide and other materials such as maltol, acetoin and acetals (e.g. 1,1-diethoxyethane,1,1-dimethoxyethane and dimethoxymethane.

The specific flavoring adjuvant selected for use may be either solid or liquid depending upon the desired physical form of the ultimate product, i.e. foodstuff, whether simulated or natural, and should, in any event, be capable of providing an environment in which the cyclic chemical compounds can be dispersed or admixed to provide a homogeneous medium. In addition, selection of one or more flavoring adjuvants, as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g. simulated foodstuffs, ingredients capable of providing normally solid compositions should be selected such as various cellulose derivatives.

As will be appreciated by those skilled in the art, the amount of 2-methoxy-4-(2-methylpropenyl)phenyl ester of isobutyric acid employed in a particular instance can vary over a relatively wide range whereby its desired organoleptic effects (having reference to the nature of the product) are achieved. Thus, correspondingly greater amounts would be necessary in those instances wherein the ultimate food composition to be flavored is relatively bland to the taste, whereas relatively minor quantities may suffice for purposes of enhancing the composition merely deficient in natural flavor or aroma. The primary requirement is that the amount selected (to be effective) be sufficient to augment or enhance the organoleptic characteristics of the parent composition (whether foodstuff per se or flavoring composition).

The use of insufficient quantities of 2-methoxy-4-(2-methylpropenyl)phenyl ester of isobutyric acid will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it is found that quantities of 2-methoxy-4-(2-methylpropenyl)phenyl ester of isobutyric acid, ranging from a small but effective amount, e.g. 0.1 parts per million up to about 20 parts per million by weight based on total composition are suitable. Concentrations in excess of the maximum quantity stated are not normally recommended, since they fail to provide commensurate enhancement of organoleptic properties. In those instances, wherein the 2-methoxy-4-(2-methylpropenyl)-phenyl ester of isobutyric acid is added to the foodstuff as an integral component of a flavoring composition, it is, of course, essential that the total quantity of flavoring composition employed be sufficient to yield an effective amount of 2-methoxy-4-(2-methylpropenyl)phenyl ester of isobutyric acid.

Food flavoring compositions prepared in accordance with the present invention preferably contain the 2-methoxy-4-(2-methylpropenyl)phenyl ester of isobutyric acid in concentrations ranging from about 0.1% up to about 15% by weight based on the total weight of said flavoring composition.

The compositions described herein can be prepared according to conventional techniques well known as typified by cake batters and fruit drinks and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by mixing the 2-methoxy-4-(2-methylpropenyl)-phenyl ester of isobutyric acid of our invention with, for example, gum arabic, gum tragacanth, carrageenan and the like, and thereafter spray-drying the resultant mixture whereby to obtain the particulate solid product. Pre-prepared flavor mixes in powder form, e.g. a fruit flavored powdered mix, are obtained by mixing the dried solid components, e.g. starch, sugar and the like and 2-methoxy-4-(2-methylpropenyl)phenyl ester of isobutyric acid in a dry blender until the requisite degree of uniformity is achieved.

It is presently preferred to combine with the 2-methoxy-4-(2-methylpropenyl)phenyl ester of isobutyric acid of our invention the following adjuvants:
p-Hydroxybenzyl acetone;
Geraniol;
Acetaldehyde;
Maltol;
Ethyl methyl phenyl glycidate;
Benzyl acetate;
Dimethyl sulfide;
Vanillin;
Methyl cinnamate;
Ethyl pelargonate;
Methyl anthranilate;
Isoamyl acetate;
Isobutyl acetate;
Alpha ionone;
Ethyl butyrate;
Acetic acid;
Gamma-undecalactone;
1-(3-(methylthio)butyryl-2,6,6-trimethyl cyclohexene;
1(3(methylthio)butyryl)-2,6,6-trimethyl-1,3-cyclohexadiene;
Naphthyl ethyl ether;
Diacetyl;
Ethyl acetate;
Anethole;
Isoamyl butyrate;
Cis-3-hexenol-1;
2-Methyl-2-pentenoic acid;
2-Methyl-cis-3-pentenoic acid;
Ethyl-2-methyl-cis-3-pentenoate;
Methyl-2-methyl-cis-3-pentenoate;
Elemecine(4-allyl-1,2,6-trimethoxy benzene);
Isoelemecine(4-propenyl-1,2,6-trimethoxy benzene);

2-(4-hydroxy-4-methylpentyl)norbornadiene prepared according to U.S. Pat. No. 3,886,289, issued on May 27, 1975; and 4,4A,5,6-tetrahydro-7-methyl-2-(3H)-naphthalenone.

The following examples are illustrative and the invention is to be considered to be restricted thereto only as indicated in the appended claims. Example I sets forth a process for producing 2-methoxy-4-(2-methylpropenyl)phenyl ester of isobutyric acid of our invention. Example II, et seq set forth the organoleptic utilities of the 2-methoxy-4-(2-methylpropenyl)phenyl ester of isobutyric acid of our invention.

All parts and percentages given herein are by weight unless otherwise specified.

EXAMPLE I

PREPARATION OF 2-METHOXY-4-(2-METHYLPROPENYL)PHENYL ESTER OF ISOBUTYRIC ACID

Reaction:

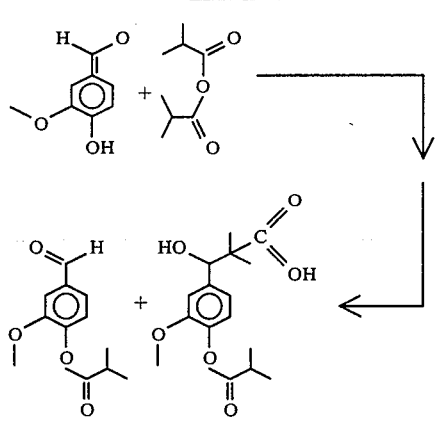

and

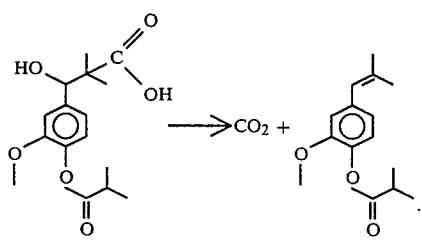

Into a 2-liter reaction flask equipped with condenser, stirrer, heating mantle and thermometer is placed 304 grams (2 moles) of vanillin having the structure:

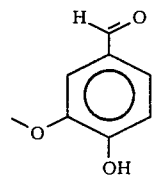

and 553 grams (3.5 moles) of isobutyric anhydride having the structure:

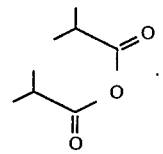

With stirring the reaction mass is heated to reflux (175° C.). The reaction mass is refluxed at atmospheric pressure for a period of twelve hours.

The reaction mass is then washed with equal volumes of saturated sodium bicarbonate solution and followed by saturated sodium chloride solution.

The reaction mass is then dried over anhydrous magnesium sulphate filtered and distilled on a one plate splash column yielding the following fractions:

| Fraction No. | Vapor Temp. (°C.) | Liquid Temp. (°C.) | Vacuum mm/Hg. Pressure | Weight of Fraction |
|---|---|---|---|---|
| 1 | 48/49 | 67/75 | 4.0 | 157.3 |
| 2 | 40 | 154 | 4.0 | 78.0 |
| 3 | 150 | 165 | 5.5 | 28.0 |
| 4 | 155 | 164 | 5.5 | 87.4 |
| 5 | 156 | 164 | 5.5 | 39.3 |
| 6 | 155 | 171 | 5.5 | 58.2 |
| 7 | 185 | 150 | 5.5 | 48.6 |
| 8 | 190 | 150 | 5.5 | 41.2 |

Fractions 3-8 are bulked for refractionation. FIG. 1 is the GLC profile for bulked fractions 3-8. The peak indicated by reference numeral "10" is the peak for the compound having the structure:

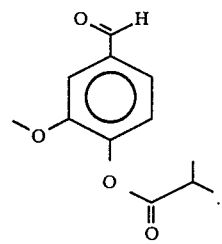

The peak indicated by reference numeral "11" is the peak for the compound having the structure:

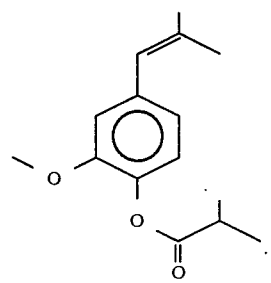

FIG. 2 is a magnification of FIG. 1. The peak indicated by reference numeral "21" is the peak for the compound having the structure:

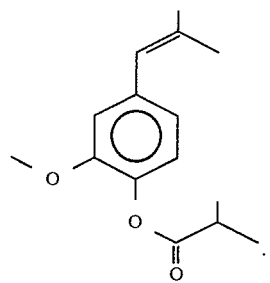

The peak indicated by reference numeral "20" is the peak for the compound having the structure:

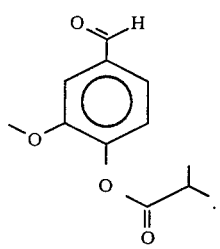

The conditions for the GLC analyses are 10'×¼", SE 30, column programmed at 100°–220° C. at 4° C. per minute.

FIG. 3 is the mass spectrum for peak "21" of the GLC profile of FIG. 2 for the compound having the structure:

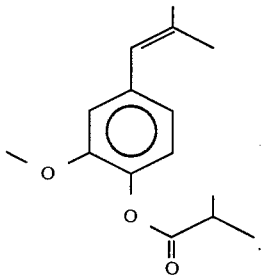

FIG. 4 is the NMR spectrum for peak "21" of the GLC profile of FIG. 2 for the compound having the structure:

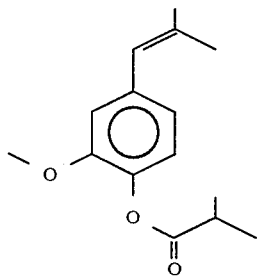

(Conditions: Field strength 100 MHz; Solvent: $CFCl_3$).
FIG. 5 is the infra-red spectrum for peak "21" of the GLC profile of FIG. 2 for the compound having the structure:

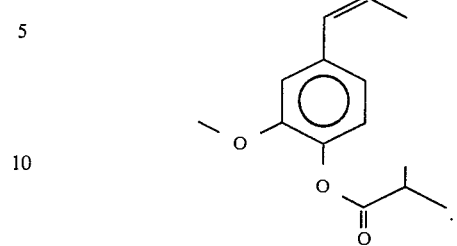

Bulked fractions 3–8 are then redistilled on a one foot Vigreux column yielding the following fractions:

| Fraction No. | Vapor Temp. (°C.) | Liquid Temp. (°C.) | Vacuum mm/Hg. Pressure | Weight of Fraction |
|---|---|---|---|---|
| 1 | 126/ | 185/ | 5.0 | 7.7 |
| 2 | 114 | 186 | 6.0 | 56.7 |
| 3 | 84 | 182 | 6.0 | 12.5 |
| 4 | 110 | 215 | 5.0 | 26.8 |
| 5 | 74 | 230 | 5.0 | 6.2 |

Fractions 2–5 are bulked and contain a major proportion of the compound having the structure:

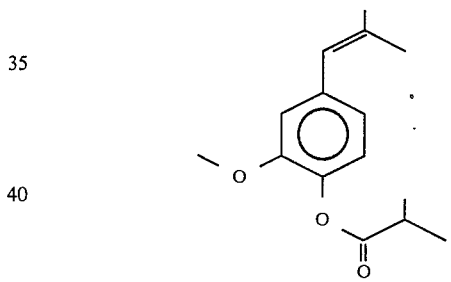

The compound having the structure:

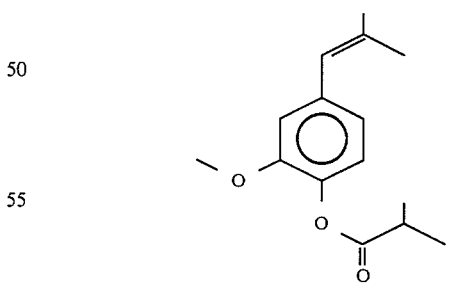

has an eggnog-like, nutmeg-like, carnation, chocolate-sweet and vanilla-bean aroma profile with an eggnog-like, nutmeg-like, carnation, vanilla-bean-like, gooseberry-like and fruit-seed-like flavor profile.

EXAMPLE II

At the level of 8 ppm, the compound having the structure:

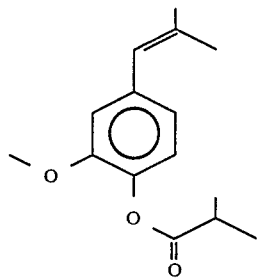

in pure form is added to Borden ® Eggnog (manufactured by the Borden Corporation of Columbus, Ohio). The compound having the structure:

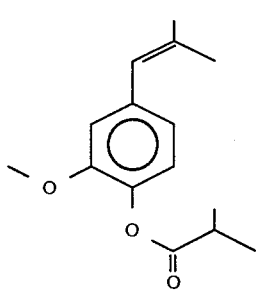

when added to said eggnog at the level indicated imparts a natural-like, nutmeg-like flavor with chocolate-sweet, vanilla-bean and fruity nuances. A bench panel of five members unanimously prefers the eggnog with the compound having the structure:

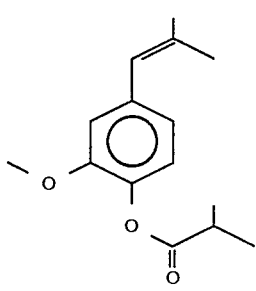

added thereto.

EXAMPLE III

VANILLA FLAVOR

The following formulation is prepared:

| | |
|---|---|
| Vanillin | 10.00 grams |
| Ethyl vanillin | 3.00 grams |
| Benzodihydropyrone | 3.00 grams |
| Heliotropin | 1.00 gram |
| Propenyl guiacol | 0.50 gram |
| Gamma nonyl lactone | 0.25 gram |
| Gamma undecalactone | 0.25 gram |
| Delta dodecalactone | 0.25 gram |
| 4,4A,5,6-tetrahydro-7-methyl-2-(3H)—naphthalenone having the structure: | 0.10 gram |
| 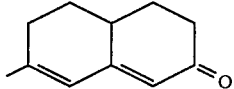 produced according to Example III of application for U.S. Letters Patent, S.N. 362,234 filed on March 26, 1982, now U.S. Pat. No. 4,385,073 issued on May 24, 1983. | |
| 2-methoxy-4-(2-methylpropenyl) phenyl ester of isobutyric acid having the structure: | 0.10 gram |
| 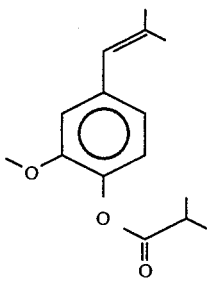 prepared according to Example I. | |

The compound having the structure:

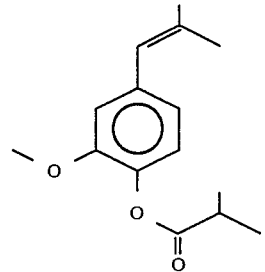

enhances the foregoing vanilla formulation imparting to it, a very interesting, nutmeg-like, eggnog-like aroma with aesthetically pleasing chocolate-sweet, natural vanilla-bean and goose-berry nuances.

The 4,4A,5,6-tetrahydro-7-methyl-2-(3H)-naphthalenone having the structure:

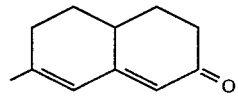

enhances the vanilla formulation (a) making it more natural-like; (b) imparting a coumarin-like, coconut-like aroma and a coumarin-like, coconut-like, almond-like, macaroon-like taste. The formulation is four times as powerful as the formulation without the compound having the structures:

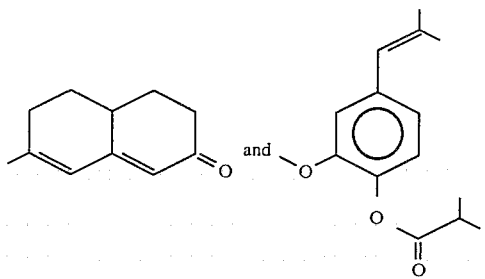

added thereto. The formulation with the compound having the structure:

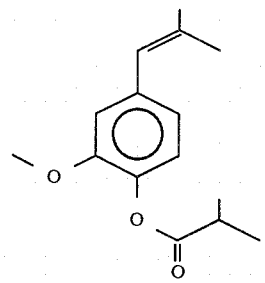

is unanimously preferred by a bench panel over the formulation without the compound having the structure:

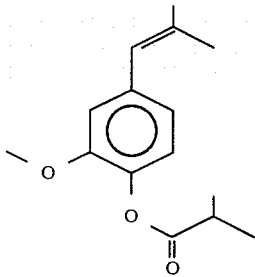

added thereto.

In addition, the formulation is rendered much more outstanding in a standard Creme-de-Kahlua formulation causing the Creme-de-Kahlua formulation to be more natural-like having pleasant nutmeg-like aroma and taste nuances and unanimously preferred by a bench panel of five members.

The resulting formulation containing the compound having the structure:

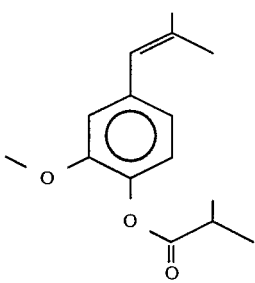

as well as the compound having the structure:

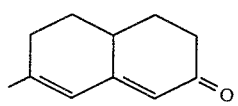

is added to the following liqueur formulation:

| Ingredients | Parts by Weight |
| --- | --- |
| Clove essential oil | 780 |
| Lemon essential oil | 400 |
| Orange essential oil | 300 |
| Cinnamon essential oil | 250 |
| Mace essential oil | 180 |
| Vanillin formulation (as set forth above) | 150 |
| Neroli essential oil | 10 |
| Citronellol | 2 |
| Rose absolute | 1 |
| Food grade ethanol | 927 |

The resulting liqueur is added to the following mixture in order to produce a consumable commercial material:

| Ingredients | Parts by Weight |
| --- | --- |
| 96% food grade ethanol | 301 kg |
| Sugar | 40 kg |
| Distilled water | 46.8 liters |
| Flavor (as set forth above) (0.5% in food grade ethanol) | 0.5 kg |

The resulting liqueur has an interesting, nutmeg-like, bitter almond taste and aroma with coconut nuances and goose-berry-like nuances and sweet chocolate undertones making it useful as such or as a "Bagne" for a sauce used for soaking pound cakes such as "Rum BaBa".

EXAMPLE IV

The vanilla flavor of Example III is placed into a ice cream mix at a rate of 0.10%. The resulting previously-unflavored ice cream has an excellent vanilla flavor with nutmeg-like nuances.

EXAMPLE V

BASIC WALNUT FLAVOR/NUTMEG FLAVOR FORMULATION

The following basic walnut flavor/nutmeg flavor formulation is prepared:

| Ingredients | Parts by Weight |
| --- | --- |
| Cyclotene | 4.0 |
| Vanillin | 1.0 |
| Butylisovalerate | 2.0 |
| Benzaldehyde | 6.0 |
| 2,3-diethyl pyrazine (10% in food grade ethanol) | 2.0 |
| Ethyl-2-methyl valerate | 2.0 |
| Gamma butyrolactone | 20.0 |
| Gamma hexenolactone | 10.0 |
| 2,4-decadienal (0.1% in food grade ethyl alcohol) | 0.5 |
| 2,4-heptadienal (0.1% in food grade ethyl alcohol) | 0.5 |
| Butylidene phthalide | 2.0 |
| Nutmeg oil | 4.5 |

| Ingredients | Parts by Weight |
|---|---|
| Propylene glycol USP | 90.5 |

The formulation is divided into four parts. To one of the parts, 0.8% by weight of 4,4A,5,6-tetrahydro-7-methyl-2-(3H)-naphthalenone having the structure:

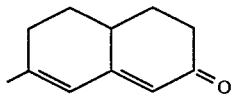

produced according to Example IV, of application for United States Letters Patent, Ser. No. 362,234 filed on Mar. 26, 1982, now U.S. Pat. No. 4,385,073 issued on May 24, 1983, distillation fraction 8, is added. To the second part of the basic walnut formulation, nothing else is added. To the third part of the basic walnut formulation, 0.7% by weight of the compound having the structure:

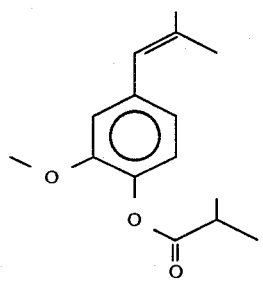

produced according to Example I, supra, is added. To the fourth part of the formulation, a 50:50 mixture (0.8% by weight total) of the compound having the structure:

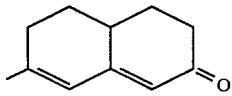

and the compound having the structure:

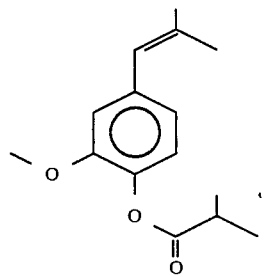

is added. All four formulations are compared at the rate of 100 ppm in water by a bench panel of five members (not affiliated with the inventors on the instant case). All members of the bench panel prefer two walnut flavors out of the four unanimously: the walnut flavor with the addition of the compound having the structure:

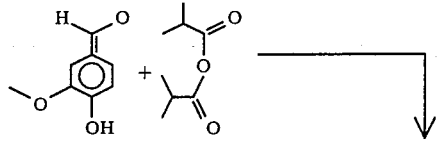

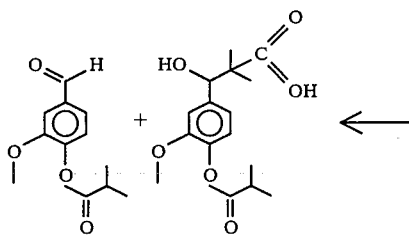

and

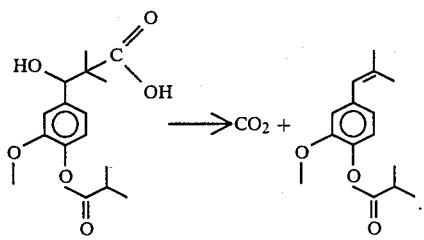

and the walnut flavor with the addition of the compound having the structures:

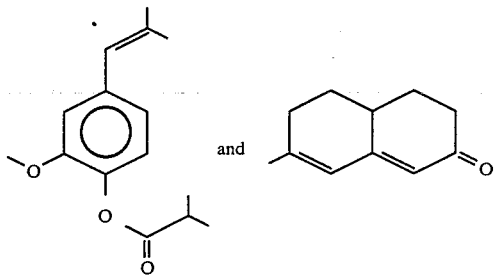

in a 50:50 admixture as a result of the additional characteristic nutmeg-like and sweet chocolate aroma and taste nuances.

EXAMPLE VI

A. Powder Flavor Formulation

Twenty grams of the flavor composition of Example V is emulsified in a solution containing 300 grams gum acacia and 700 grams of water. The emulsion is spray dried with a Bowen Lab Model Drier utilizing 260 c.f.m. of air with an inlet temperature of 500° F. and an outlet temperature of 200° F. and a wheel speed of 50,000 rpm.

B. Sustained Release Flavor

The following mixture is prepared:

| Ingredient | Parts by Weight |
|---|---|
| Liquid walnut flavor composition of Example V | 20 |
| Propylene glycol | 9 |
| Cab-O-Sil ® M-5 (brand of | |

| Ingredient | Parts by Weight |
|---|---|
| silica produced by the Cabot Corp. of 125 High St., Boston, Mass. 02110<br>Physical properties<br>Surface area: 200 m²/gm<br>Nominal particle size: 0.012 microns<br>Density: 2.3 lbs/cu. ft.) | 5 |

The Cab-O-Sil ® is dispersed in the liquid walnut flavor composition of Example V with vigorous stirring thereby resulting in a viscous liquid. Seventy-one parts by weight of the powder flavor composition of Part A, supra, is then blended into said viscous liquid with stirring at 25° C. for a period of 30 minutes resulting in a dry, free-flowing sustained release flavor powder.

EXAMPLE VII

Ten parts by weight of 50 Bloom pigskin gelatin is added to ninety parts by weight of water at a temperature of 150° F. The mixture is agitated until the gelatin is completely dissolved and the solution is cooled to 120° F. Twenty parts by weight of the liquid flavor composition of Example XVII is added to the solution which is then homogenized to form an emulsion having a particle size typically in the range of 2–5 microns. The material is kept at 120° F. under which conditions the gelatin will not gel.

Coacervation is induced by adding slowly and uniformly, forty parts by weight of a 20% aqueous solution of sodium sulphate. During coacervation of gelatin, molecules are deposited uniformly about each oil droplet as a nucleus.

Gelation is effected by pouring the heated coacervate mixture into 1,000 parts by weight of a 7% aqueous solution of sodium sulphate at 65° F. The resulting gelled coacervate may be filtered and washed with water at temperatures below the melting point of gelation, to remove the salt.

Hardening of the filter cake, in this example, is effected by washing with 200 parts by weight of 37% solution of formaldehyde in water. The cake is then washed to remove the residual formaldehyde.

EXAMPLE VIII

CHEWING GUM

One hundred parts by weight of chicle are mixed with four parts by weight of the flavor prepared in accordance with Example V, Part B. Three hundred parts of sucrose and one hundred parts of corn syrup are added. Mixing is effected in a ribbon blender with jacketed side walls of the type manufactured by the Baker Perkins Co.

The resultant chewing gum blend is then manufactured into strips one inch in width and 0.1 inches in thickness. The strips are cut into lengths of three inches each. On chewing, the chewing gum has a pleasant, long-lasting sweet, nutmeg-like, walnut flavor.

EXAMPLE IX

CHEWING GUM

One hundred parts by weight of chicle are mixed with eighteen parts by weight of the flavor prepared in accordance with Example VII. Three hundred parts of sucrose and one hundred parts of corn syrup are then added. Mixing is effected in a ribbon blender with jacketed side walls of the type manufactured by the Baker Perkins Co.

EXAMPLE X

TOOTHPASTE FORMULATION

The following separate groups of ingredients are prepared:

| Parts by Weight | Ingredients |
|---|---|
| Group "A" | |
| 30.200 | Glycerine |
| 15.325 | Distilled water |
| 0.100 | Sodium benzoate |
| 0.125 | Saccharin sodium |
| 0.400 | Stannous fluoride |
| Group "B" | |
| 12.500 | Calcium carbonate |
| 37.200 | Dicalcium phosphate (dihydrate) |
| Group "C" | |
| 2.000 | Sodium n-lauroyl sarcosinate (foaming agent) |
| Group "D" | |
| 1.200 | Flavor material of Example VI, Part B |
| 100.000 | (total) |

Procedure:
1. The ingredients in Group "A" are stirred and heated in a steam jacketed kettle to 160° F.
2. Stirring is continued for an additional three to five minutes to form a homogeneous gel.
3. The powders of Group "B" are added to the gel, while mixing until a homogeneous paste is formed.
4. With stirring, the flavor of "D" is added and lastly, the sodium n-lauroyl sarcosinate.
5. The resultant slurry is then blended for one hour.

The completed paste is then transferred to a three roller mill and then homogenized, and finally tubed.

The resulting toothpaste, when used in a normal toothbrushing procedure, yields a pleasant, sweet, nutmeg-like, walnut flavor of constant strong intensity throughout said procedure (1–1.5 minutes).

EXAMPLE XI

CHEWABLE VITAMIN TABLETS

The flavor material produced according to the process of Example VI, Part B, is added to a chewable vitamin tablet formulation at a rate of 10 gm/kg which chewable vitamin tablet formulation is prepared as follows:

In a Hobart Mixer, the following materials are blended to homogeneity:

| Ingredients | Gms/1000 Tablets |
|---|---|
| Vitamin C (ascorbic acid as ascorbic acid-sodium ascorbate mixture 1:1) | 70.000 |
| Vitamin B$_1$ (thiamine mononitrate) as Rocoat ® thiamine mononitrate 33⅓% (Hoffman LaRoche) | 4.000 |
| Vitamin B$_2$ (riboflavin) as Rocoat ® riboflavin 33⅓% | 5.000 |
| Vitamin B$_6$ (pyridoxine hydrochloride) as Rocoat ® pyridoxine hydrochloride 33⅓% | 4.000 |
| Niacinamide as Rocoat ® niacinamide 33⅓% | 33.000 |
| Calcium pantothenate | 11.500 |
| Vitamin B$_{12}$ (cyanocobalamin) as Merck 0.1% in gelatin | 3.500 |

-continued

| Ingredients | Gms/1000 Tablets |
| --- | --- |
| Vitamin E (dl-alpha topcopheryl acetate) as dry Vitamin E acetate 33⅓% Roche | 6.600 |
| d-Biotin | 0.044 |
| Certified lake color | 5.000 |
| Flavor of Example VI, Part B | as indicated above |
| Sweetener sodium saccharin | 1.000 |
| Magnesium stearate lubricant | 10.000 |
| Mannitol q.s. to make | 500.000 |

Preliminary tablets are prepared by slugging with flatfaced punches and grinding the slugs to 14 mesh. 13.5 grams dry Vitamin A acetate and 0.6 grams Vitamin D are then added as beadlets. The entire blend is then compressed using concave punches at 0.5 grams each.

Chewing of the resultant tablets yields a pleasant, long-lasting, consistently strong, walnut, nutmeg-like flavor for a period of 12 minutes.

EXAMPLE XII

CHEWING TOBACCO

Onto 100 pounds of tobacco for chewing (85% Wisconsin leaf and 15% Pennsylvania leaf) the following casing is sprayed at a rate of 30%:

| Ingredients | Parts by Weight |
| --- | --- |
| Corn syrup | 60.0 |
| Licorice | 10.0 |
| Glycerine | 20.0 |
| Fig juice | 4.6 |
| Prune juice | 5.0 |
| Flavor material of Example VI, Part B | 0.4 |

The resultant product is redired to a moisture content of 20%. On chewing, this tobacco has an excellent substantially consistent, long-lasting, sweet, walnut, nutmeg-like nuance (20 minutes) in conjunction with the main fruity tobacco note.

EXAMPLE XIII

FLAVORED FOODSTUFF 2.25 Ounces of a coconut macaroon mix distributed by Drake Bakeries, Division of Borden, Inc. of Columbus, Ohio 43215 is intimately admixed at the level of 10 ppm with the compound having the structure:

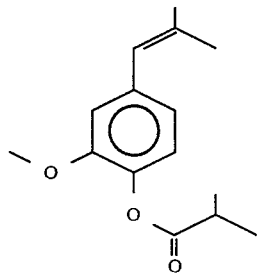

produced according to Example I.

The coconut macaroon composition contains corn syrup, coconut, sugar and egg whites.

The coconut macaroon composition is then baked at 325° F. at atmospheric pressure for a period of 20 minutes. The resultant coconut macaroon cookies have an excellent "natural coconut" notes with intense nutmeg nuances not present in the cookies without the compositions of Example I.

When the composition of Example I is replaced with the composition of Example III or IV, a similar natural coconut nuance is created with nutmeg-like characteristics.

What is claimed is:

1. The process for preparing the compound having the structure:

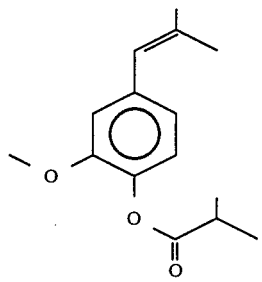

comprising the step of reacting isobutyric anhydride with vanillin thereby yielding a compound having the structure:

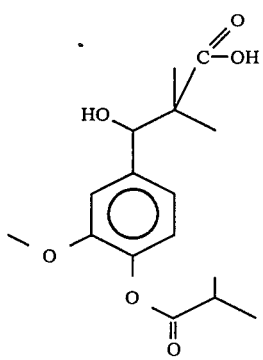

and then decarboxylating the compound having the structure:

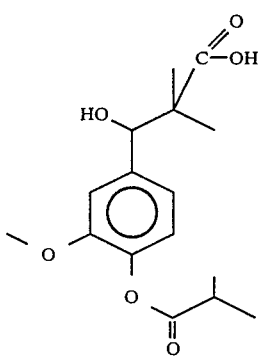

to yield the compound having the structure:

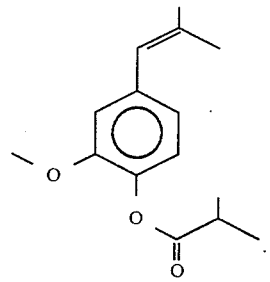
2. The compound having the structure:
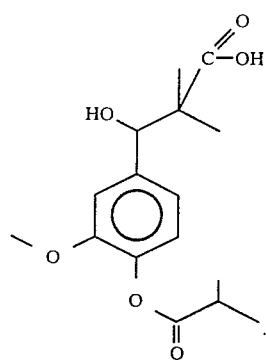
* * * * *